United States Patent [19]
O'Brien, deceased et al.
[11] 3,970,804
[45] July 20, 1976

[54] ELECTRO-MECHANICAL AMPLIFIER SOUND TRANSDUCER

[76] Inventors: Jerry O'Brien, deceased, late of Jersey City, N.J.; Catherine H. O'Brien, executrix, 33 Pamrapo Ave., Jersey City, N.J. 07305

[22] Filed: Mar. 25, 1974

[21] Appl. No.: 454,224

[52] U.S. Cl. .......... 179/131; 178/102; 179/141

[51] Int. Cl.² .......... H04L 15/04; H04R 21/00; H04R 21/02

[58] Field of Search .......... 178/101, 102, 106; 179/113, 121 R, 131, 136, 137, 140, 141, 142, 143, 145, 179; 340/261

[56] References Cited

UNITED STATES PATENTS

| | | | |
|---|---|---|---|
| 291,312 | 1/1884 | Drawbaugh | 179/142 |
| 292,603 | 1/1884 | Waite | 179/113 |
| 310,151 | 12/1884 | Rogers | 179/143 |
| 315,368 | 4/1885 | Woods | 178/106 |
| 339,501 | 4/1886 | Thompson | 179/113 |
| 359,188 | 3/1887 | Tabony | 179/143 |
| 452,758 | 5/1891 | Muller | 179/131 |
| 484,778 | 10/1892 | Collier | 179/142 |
| 531,194 | 12/1894 | Kusel | 179/143 |
| 879,568 | 2/1908 | Murray | 340/261 |
| 1,435,719 | 11/1922 | McCaa | 179/179 |

FOREIGN PATENTS OR APPLICATIONS

| | | | |
|---|---|---|---|
| 340,435 | 7/1904 | France | 179/131 |

*Primary Examiner*—George G. Stellar
*Attorney, Agent, or Firm*—Richard L. Miller

[57] ABSTRACT

This invention describes an electromechanical amplifying sound transducer including a diaphragm which responds to input energy, such as acoustical waves and mechanical pulses, and vibrates in response thereto. Conductive supports mounted onto the diaphragm are adapted to be interconnected to a source of electrical energy. A weighted conductive bar is loosely coupled to the supports and interconnects them. The supports transmit the vibrations to the bar whereby the bar can control the electrical energy delivered from the source of electrical energy so that the acoustic waves or mechanical pulses are converted into amplified electrical waves.

18 Claims, 17 Drawing Figures

106
118
116
124
114
108
112
110

106
102
108
114
110
104

200
202
P
208
206
N
204

106
118
114
120
102
124
114
104
120
122
116
110

202
P
210
206
N
208
204

202
208
P
204'
202'
200
210
210'
N
N
204
P 222
200
202
P
N
206
214
204
220
216
WEIGHT
218

200
202
P
208
212
210
N
204

Fig. 14
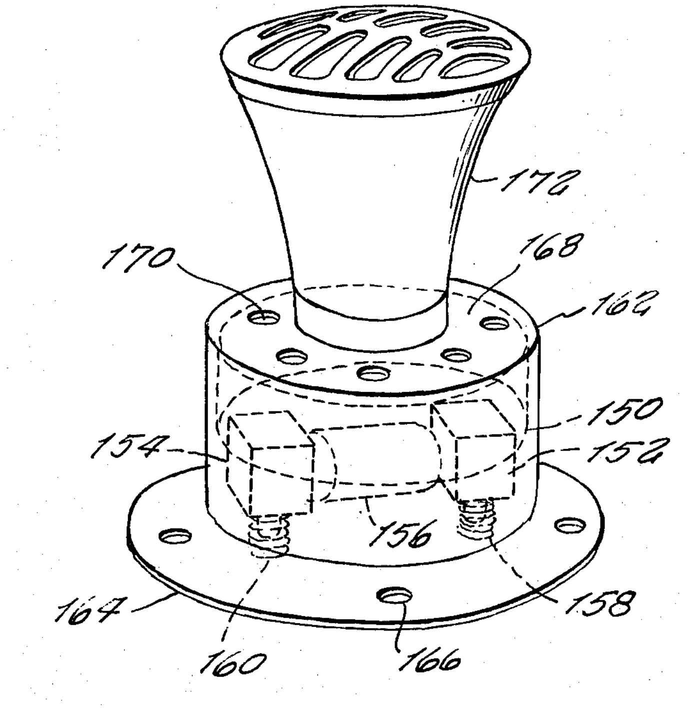
Fig. 15
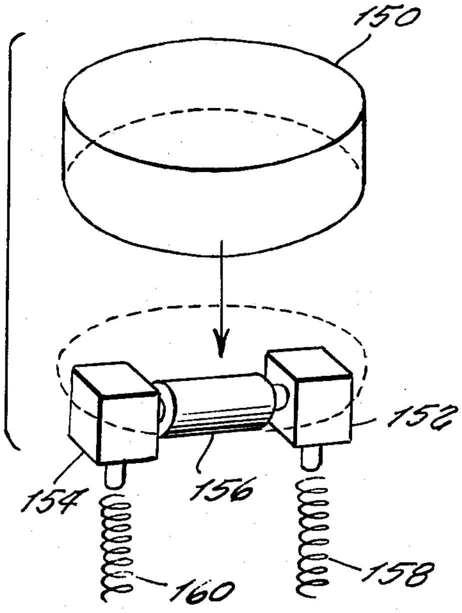
Fig. 16
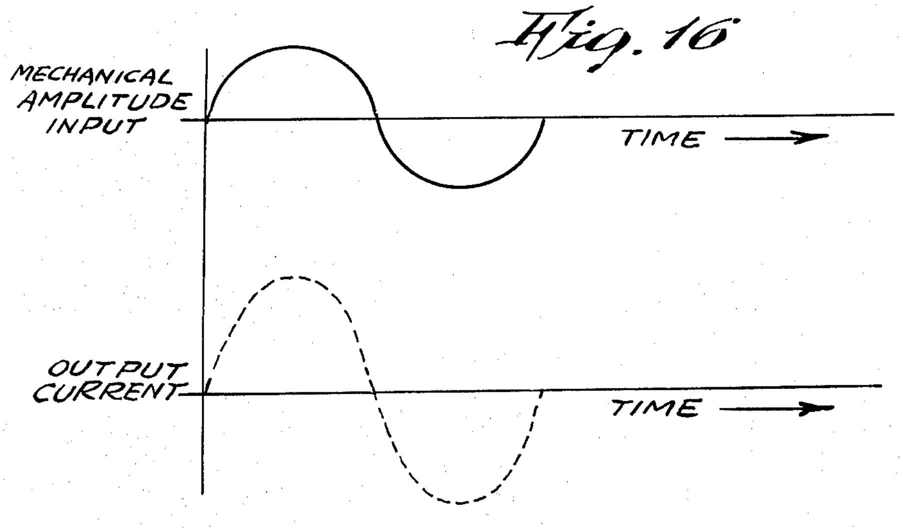
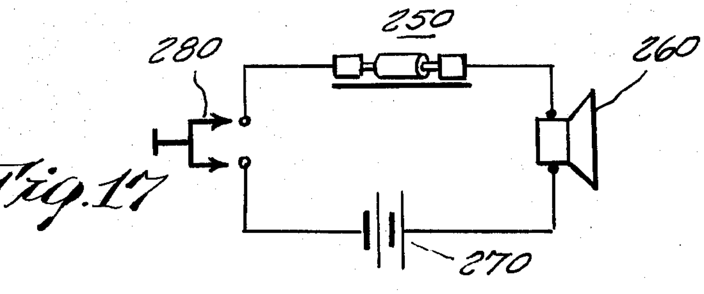
Fig. 17

ELECTRO-MECHANICAL AMPLIFIER SOUND TRANSDUCER

BACKGROUND OF THE INVENTION

This invention relates to an electromechanical amplifying sound transducer and more particularly to a device for converting acoustical or mechanical power into electrical power which has essentially similar wave characteristics, by converting the sound wave or mechanical pulse into corresponding but amplified electrical waves.

Sound transducers are well known in the art, however, most of these are electrical devices and require the use of electrical amplification apparatus in conjunction with the sound transducer in order to reproduce the acoustic power. The amplification device can usually be controlled to operate over a desired frequency range, to exhibit a sufficient amount of gain while having a sufficient sensitivity to reproduce various sounds, and at the same time exhibit a reduced noise level. As a result, in various sound systems such as telephones, public address systems, dictating machines, sound recording apparatus, etc., the transducer and amplifier are exceedingly complex devices and represent a basic cost of the entire system.

It is accordingly an object of the present invention to provide an electromechanical amplifying sound transducer which can convert sound waves or mechanical pulses into corresponding but amplified electric waves.

A further object of the present invention is to provide an electromechanical amplifier sound transducer in which various amplification factors such as frequency response, gain, noise level, and sensitivity can be appropriately controlled.

Still a further object of the present invention is to provide an electromechanical amplifying sound transducer which can be utilized as a microphone device in a sound system.

Yet another object of the present invention is to provide an electromechanical amplifying sound transducer in which the input sound signal is utilized to control the energy delivered by a battery to a detector.

A further object of the present invention is to provide an electromechanical amplifying sound transducer which can be utilized as a combination telegraphic transmitter and voice transmitter.

Yet another object of the present invention is to provide an electromechanical amplifying transducer which can be utilized to transmit both pulsed information such as binary data, as well as audible voice transmission.

Still a further object of the present invention is to provide an electromechanical amplifying transducer which is simple in construction, reliable in operation, and inexpensive in manufacture.

SUMMARY OF THE INVENTION

Briefly, the present invention provides an electromechanical amplifying sound transducer which includes a diaphragm which receives acoustic waves or mechanical pulses and vibrates in response thereto. Conductive supports are mounted onto the diaphragm and are adapted to be interconnected to a source of electrical energy. A weighted conductive bar is loosely coupled to the supports. When the diaphragm vibrates in response to the acoustic waves or the mechanical pulses, the supports transmit the vibrations to the bar, whereby the bar can control the electric energy delivered from the source of electrical energy so that the acoustic waves or the mechanical pulses are converted into amplified electrical waves.

The amplifying transducer can be controlled to provide suitable gain, frequency response, noise level and sensitivity. For example, by controlling the amount of mass provided by the weighted conductive bar, the frequency response of the amplifier can be controlled. The frequency response can also be controlled by modifying the vibratory characteristics of the diaphragm. The gain of the amplifying transducer can be controlled by varying the angle between the weighted conductive bar and a vertical axis. The noise level can be controlled by varying the type of material utilized for the conductive supports and the weighted conductive bar. The sensitivity of the amplifying transducer can be controlled by varying the center of gravity of the mass on the weighted conductive bar. Other types of amplification control can also be achieved by varying different elements in the amplifying transducer.

In one embodiment of the invention, wherein batteries are utilized as the source of electric energy, a housing is provided for containing the batteries in a series circuit combination with a control switch and output terminals. The output terminals are adapted to be connected to a suitable detector. On the front of the housing is positioned the electromechanical amplifying sound transducer wherein the diaphragm is utilized as a protective covering. The conductive supports of the transducer are interconnected into the series circuit combination.

In another embodiment, the electromechanical amplifying sound transducer is located within a housing having a plurality of holes positioned with respect to the diaphragm to relieve the baffling effect of the air pressure caused by the sound waves. A voice cone is coupled to the housing to improve the directivity of the acoustic energy reaching the diaphragm.

In yet another embodiment, the electromechanical amplifying transducer is utilized as a combination audible sound transmitter, as well as a date transmitter for sending binary data such as telegraphic information of the Morse Code type or other types of binary information. An interrupt device is arranged to intermittently disconnect the weighted conductive bar from the supports to thereby control the supply of electric energy.

The aforementioned objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

FIG. 14 is a perspective front view of another embodiment of the electromechanical amplifying sound transducer in accordance with the present invention;

FIG. 15 is an exploded perspective view of the components of the electromechanical amplifying sound transducer utilized in FIG. 14;

FIG. 16 are graphs showing the effect of the present invention of converting an input of mechanical or sound energy into amplified electrical energy; and FIG. 17 is a schematic electrical circuit diagram of a sound system utilizing the electromechanical amplifying sound transducer of the present invention.

DESCRIPTION OF THE PREFERRED EMBODIMENTS

Figure 1:
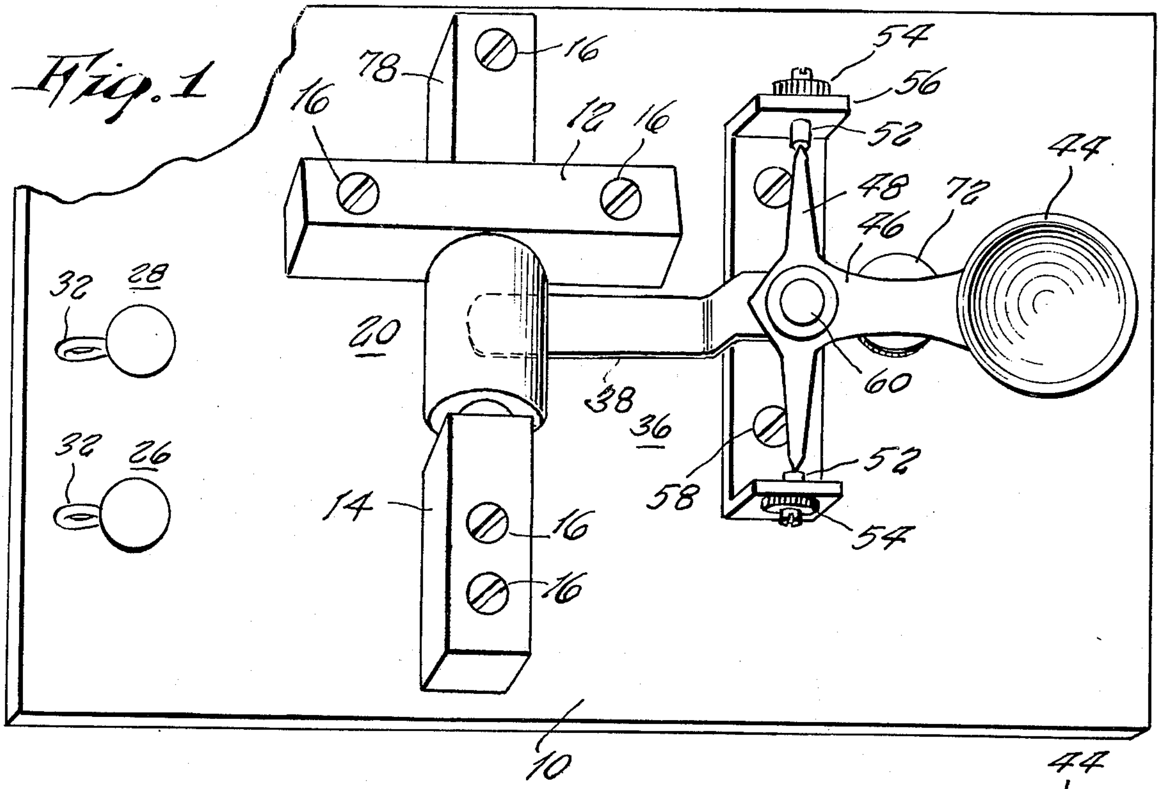
FIG. 1 is a plan view of an electromechanical amplifying device for transmission of binary information and audible sound.
Figure 2:
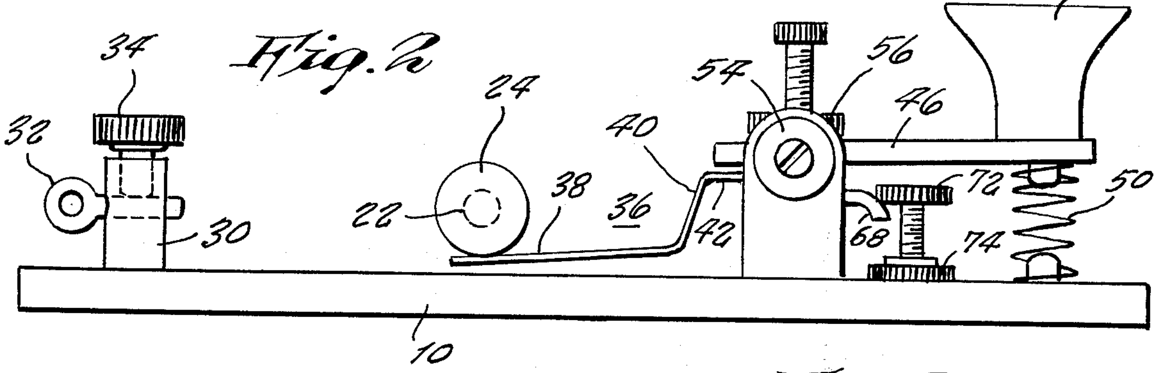
FIG. 2. is a side view of the device shown in FIG. 1 with the supports eliminated to better view the conductive bar.
Figure 3:
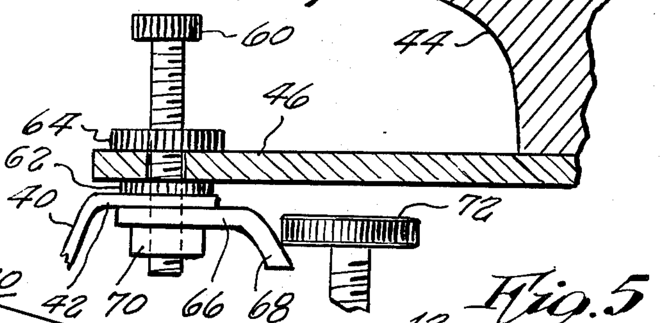
FIG. 3 is a fragmentary sectional side view of the binary control element of the device shown in FIG. 1.
Figure 4:
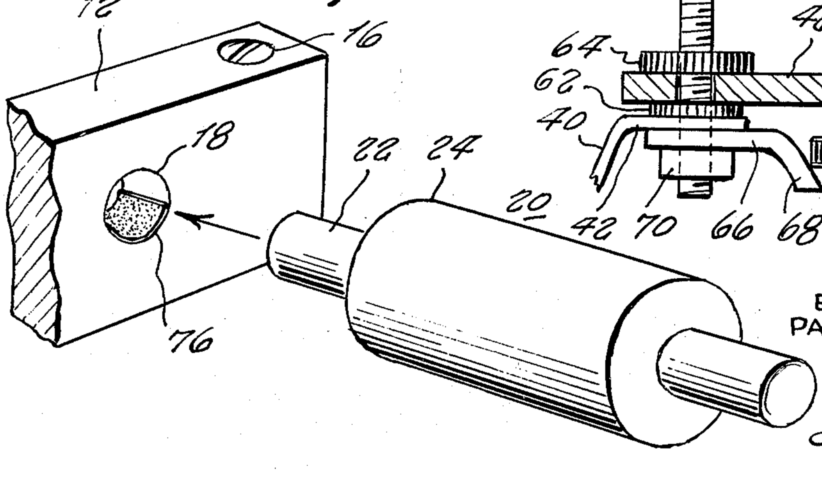
FIG. 4 is a top perspective view of the support and weighted conductive bar of the device shown in FIG. 1.
Figure 5:
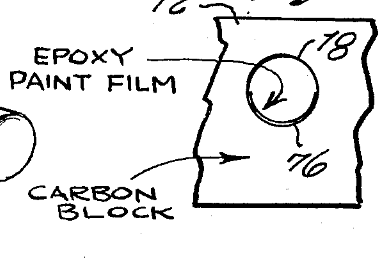
FIG. 5 is a fragmentary side view of the support utilized in the device shown in FIG. 1.

Referring now to FIGS. 1–5, there is shown an embodiment of the present invention utilizing the electromechanical amplifying device for transmission of binary and audible sounds. Mounted on a base 10 are vertical conductive supports 12, 14 which are fixed to the base means by screws 16. Each of the vertical supports 12, 14 contain holes 18 such that the holes from the two supports are axially aligned with each other. A weighted conductive bar 20 is positioned in the holes 18 to interconnect the supports 12, 14. The weighted conductive bar is shown including a conductive shaft portion 22 and a weight 24. The thickness of the shaft is so arranged as to loosely fit within the holes 18.

Terminals 26 and 28 are located at one end of the base 10 and each includes a vertical stem 30 which is coupled to the base 10 and a terminal contact 32 which is securely held within the vertical stem 30 by means of the set screw 34. Electrical wires can be connected to the terminals 26, 28 by interconnecting the wires to the contacts 32. Each of the vertical supports 12, 14 would be respectively connected to one of the terminals 26, 28. A source of electrical energy (not shown) would be serially interconnected with a suitable detector, and the series combination would be interconnected between the terminals 26 and 28. When the weighted conductive bar 24 is in its normally resting position, the shaft 22 lies at the bottom of the holes 18 in the supports 12, 14 and electrically interconnects the supports 12, 14 to thereby complete a closed electrical circuit including the energy source and the detector.

When the base 10 is located in a position to receive acoustic power such as audible sound, the base 10 will vibrate in response thereto. The vibrations are caused by the air pressure set in motion by the sound waves. The vibrations of the base 10 are transmitted by the vertical supports 12, 14 to the weighted conductive bar, loosely located in the holes 18, to intermittently cause the weighted bar 24 to lift from its resting position and interrupt the flow of electrical energy. This make-and-break contact will modulate the electric energy supplied by the source of electrical energy. In this manner the device controls the energy delivered by the source of electrical energy so that the acoustic power in the form of sound waves is converted into a corresponding and amplified electric wave.

In addition to transmitting amplified acoustic power, the device shown in FIG. 1–5 can transmit binary information. For this purpose there is included a lever 36 having a first lower portion 38 positioned to lie under the weighted conductive bar 20, and approximately vertical second intermediate section 40, and a substantially flat third upper section 42.

A telegraph key type arrangement is utilized to convert mechanical pulses into the binary information, and includes a knob 44 positioned on one side of a T-shaped member including a first section 46 and a second section 48. Located on the under side of section 46, beneath the knob 44, is spring 50 which interconnects section 46 with the base 10. The section 48 of the T-shaped member is held in pivotal arrangement by pivots 52 secured by screws 54 to a cradle shaped holding device 56 which is fastened by means of screws 58 to the base 10. Positioned in the center of the cradle device 56 is a bolt 60 on which is connected the upper portion 42 of the lever 36 and the T-section 48 separated by means of a wahser 62. A lock washer 64 is positioned above the section 48 to hold it in place onto the bolt 60.

When the knob 44 is depressed against the spring 50, the section 46 will slightly lower pivoting around the pivots 52 in the cradle 56. The lowering of section 46 will cause section 42 of the lever 36 to bend therewith which will cause section 38 of the lever 36 to slightly rise, thereby lifting the weighted conductive bar 20 from its resting position in the holes 18 of the supports 12, 14. This will serve to interrupt the flow of electric energy from the source of electrical energy. By arranging the utilization of the button 44 to have a binary information content, as for example, Morse Code or computer type binary signals, the device heretofore described can be utilized to transmit this binary information by converting it into amplified electrical signals.

In order to initially set section 38 of the lever 36 such that in its resting position it will lie just beneath the weighted conductive bar 20, there is provided an adjusting means including an adjusting flange 66 having a shoulder portion 68. A flange 66 is positioned directly beneath the section 42 of the lever 36 and is held onto the bolt 60 by means of the nut 70. The adjusting screw 72 connected to the base 10 by means of the nut 74 and can be raised or lowered against the shoulder 68. As the screw 72 is tightened onto the base 10 it depresses the shoulder 68 which in turn serves to raise the flange 66 thereby raising the lever 36 and section 38 of the lever 36 will therefor be raised. In a similar manner, by raising the screw 72, the shoulder 68 will also rise and lower the flange 66 to cause section 38 of the lever 36 to be in a lower position under the bar 20.

During its resting position, the shaft 22 will rest on the bottom of the holse 18. This will normally provide a complete electrical circuit and will cause the electric energy to constantly flow. In order to conserve the electrical energy, it is possible to arrange the bottom of the holes 18 to be insulating, as by way of example by placing an insulating coating 76 on the bottom of the holes 18. The insulating material can by an epoxy film which is painted on the bottom of the holes 18. Utilizing the insulating material, in its resting position no energy will flow. When either acoustic power or the binary information from a mechanical pulse depressing knob 44 causes the bar 20 to rise off its resting position, it will contact the top portion of the holes 18 and will then cause the energy to flow.

Although the vertical conductive support 12 is shown as lying in a perpendicular plane to the vertical support 14, it is understood that both the supports 12, 14 could be arranged to lie in the same vertical plane. However, utilizing the arrangement as shown, the hole 18 in the support 14 can be made to only extend far enough into the support 14 to permit the shaft to extend partially therein. On the other hand, the hole 18 in the support 12 can be made to extend entirely through the support 12 such that the shaft also extends entirely through the thickness of the support 12 and in fact extends onto the other side of the support 12. For this purpose a bearing support 78 is provided on the opposite side of the vertical support 12. The bearing support 78 is fastened onto the base 10 by means of the screw 16 and provides a bearing pressure onto the outer end of the shaft portion passing through the hole 18 of the vertical support 12. By using this arrangement, the bar 20 is securely held within the vertical support section 12, 14 and sufficient bearing pressure is provided onto the shaft to prevent its response to noise and other shaking which may tend to vibrate the bar 20 unnecessarily.

The base portion should typically be made of non conductive material. However, if a conductive base is used, there should preferably be included some insulation between the conductive supports 12, 14 and the base.

Figure 6:
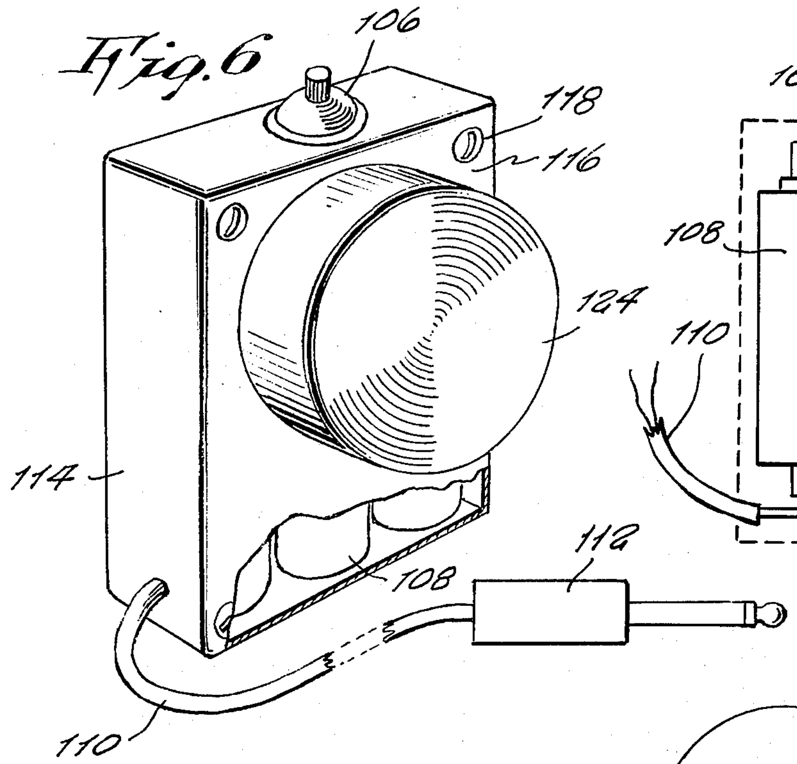
FIG. 6 is a perspective front view of another embodiment of the electromechanical amplifying sound transducer in accordance with the present invention.
Figure 7:
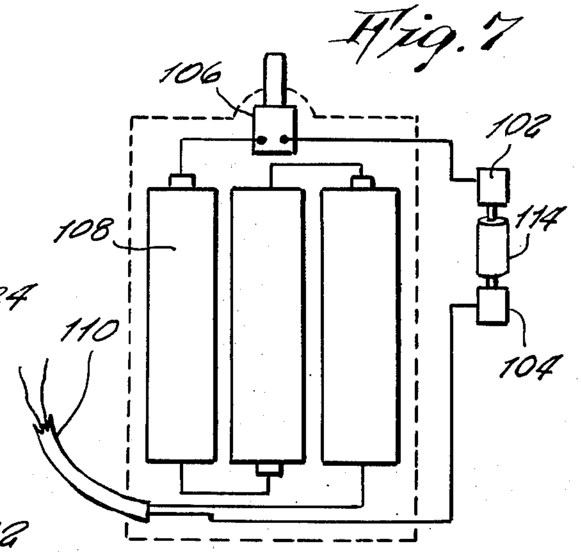
FIG. 7 is a schematic illustration of the electric components of the device shown in FIG. 6.
Figure 8:
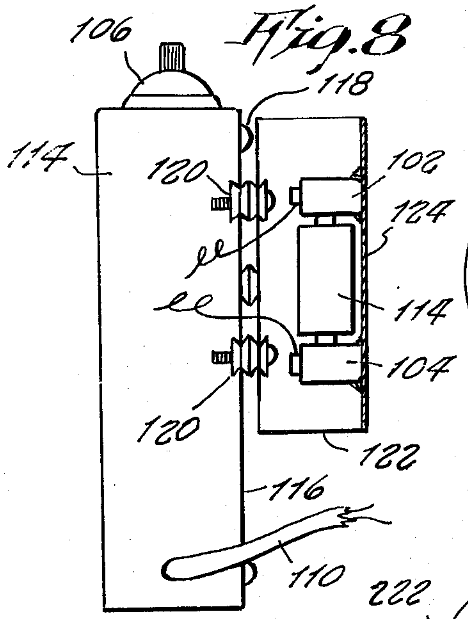
FIG. 8 is a cut-away side view of the device shown in FIG. 6.
Figure 9:
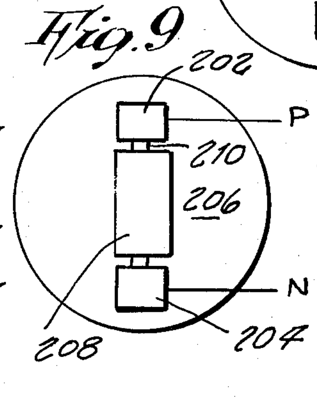

The electromechanical amplifying transducer of the present invention can also be utilized as a sound transducer. Referring now to FIGS. 6–8, the conductive supports 102, 104 are shown electrically connected in series with a switch 106, batteries 108, and output terminals 110. The output terminals 110 are shown by way of example as being connected to an external plug 112 which can be inserted into a suitable detector (not shown) such as a speaker or other output device. The weighted conductive bar 114 is interconnected between the two conductive supports 102, 104 to complete the series circuit connection.

Switch 106 and battery 108 are contained within a housing 114 having a front cover 116 fastened thereto by means of the screws 118. The terminal wires 110 extend from the housing 114. Connected onto the cover 116 by means of screws 120 is a cylindrical housing 122 having a flexible cover thereon 124. The conductive supports 102, 104 and the weighted conductive bar 114 are contained within the cylindrical housing 122.

In operation, sound waves such as audible voice is detected by the device, and the flexible cover 124 is caused to vibrate in response to the sound waves. The flexible cover 124 therefore serves as both the diaphragm of the electromechanical amplifying sound transducing device and the protective cover. The vibrations of the diaphragm 124 cause the weighted conductive bar to intermittently disconnect the electric connection between the supports 102, 104 and thereby controls the amount of electrical energy supplied by the batteries 108. In this manner, the sound waves are converted into corresponding amplified electric wave. The electric wave can be detected by a suitable detector such as a speaker which can be coupled to the device by means of the plug 112.

Referring now to FIGS. 14 and 15, there is shown an alternate arrangement of the electromechanical amplifying sound transducer of the present invention. The diaphragm 150 is positioned over the conductive supports 152, 154 having the weighted conductive bar 156 connected therebetween. Electric wires 158, 160 extending from the supports 152, 154 are available for interconnecting a suitable energy source as well as a detector and a switch, if desired. The transducer is included within a cylindrical housing 162 which includes a flange on the bottom thereof containing screw holes 166 to permit mounting the device onto a base. The housing 162 includes a flat upper surface 168 which has a plurality of holes 170 contained therein. A voice cone 172 is positioned into the upper flat portion 168 of the cylindrical housing 162. The voice cone 172 is positioned above the diaphragm 150 to increase the acoustic energy reaching the diaphragm 150 and to eliminate sounds originating away from the area of the voice cone itself.

In operation, acoustic power in the form of sound waves will be transmitted to the diaphragm 150 by means of the voice cone 172. The diaphragm 150 will vibrate in response to the sound waves and thereby cause the weighted bar 156 to intermittently disconnect the conducting supports 152, 154 thereby controlling the amount of energy delivered by an external electrical energy source and thereby converting the sound waves into electric waves. The acoustic power is transmitted by means of varying air pressure which is transmitted to the diaphragm 150. The holes 170 permit the air pressure to leave the cylinder after effecting the diaphragm 150 without causing a baffling problem which would tend to interfere with proper reception of the sound waves. Additional air holes can be provided on the under-neath side of the housing 162 which can also serve to inhibit the interference of the trapped air.

Figure 10:
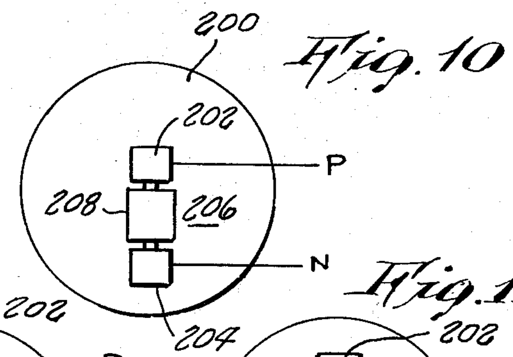
FIGS. 9–13 are schematic illustrations of various ways of controlling amplification factors of the electromechanical amplifying sound transducer in accordance with the present invention.

It is apparent from the foregoing that the device of the present invention converts sound waves to electric waves and at the same time provides amplification of the energy. Thus, the device of the present invention effectively serves as an amplifier. As such, it also contains elements to control various amplification factors such as frequency response, amplification gain, noise level, and sensitivity. By way of example, the frequency response of the amplifier can be controlled by controlling the amount of weight contained on the weighted conductive bar. Referring now to FIGS. 9–13, there is shown the diaphragm 200 with the conductive supports 202, 204 and the weighted conductive bar 206, including a shaft 210 and a weight 208. The weight 208 is shown as a mass which is affixed to the shaft. One of the supports, 202 is shown being supplied with a positive polarity from an energy source and the other of the supports 204 is shown supplied with the negative terminal of the source of energy. In FIG. 10 the conductive supports 202, 204 and the weighted conductive bar 206 is shown shifted from the center of the diaphragm 200. Also, a smaller weight 208 us utilized. Varying the weight of the conductive bar can change the frequency response of the amplifier. When the conductive bar and the supports are positioned in the center of the diaphragm, the amplifer will have less gain, in that the response will be softer, but at the same time it will be less noisey. On the other hand, by locating it off-center as in FIG. 10, there will be provided additional gain, in that the signal will be louder but it will be more sensitive to noise. It is also possible to change the frequency response by changing the vibratory characteristics of the diaphragm 200.

Figure 13:
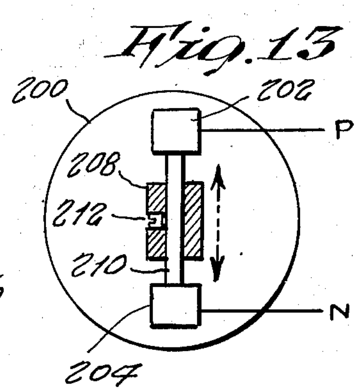

Referring to FIG. 13, it is also possible to have the position of weight 208 adjustable along the shaft 210 and permitting it to be fixed by means of a set screw 212. By shifting the position of the weight along the shaft 210 the sensitivity of the amplifier can be controlled.

Figure 12:
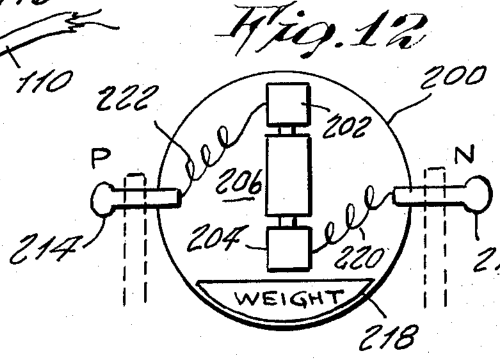

In FIG. 12 the entire amplifier is shown in a vertical arrangement being supported by the pivots 214, 216 lying along a horizontal axis and utilizing a weight 218 to hold the amplifier in its vertical position. The pivots 214, 216 can also be utilized as the contact terminals such that the wires 220, 222 can interconnect the conductive supports 202, 204. When the amplifier lies in a vertical position, the angular relationship between the conductive bar and a vertical axis can be changed. By varying this angular relationship, the gain of the amplifier can be controlled. Thus, the highest gain has been found when the angular relationship between the conductive bar and the vertical axis is between 0° and 45°. The lowest gain has been found when the conductive bar lies in a horizontal axis.

Figure 11:
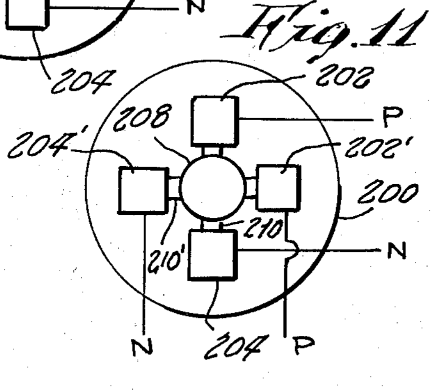

Referring now to FIG. 11, another arrangement is shown. Instead of using only two conductive supports with a single interconnecting bar, a total of four orthogonally arranged conductive supports are shown in quadrature relationship, 202, 202', 204, 204'. In this regard, two conductive bars 210, 210' are utilized and a single weight 208 is positioned at the point of interconnection between the two bars 210, 210'.

Additional control of the amplifier can be had by utilizing various materials. Thus, when utilizing semiconductive electrical material, such as carbon, for both the conductive supports and the weighted conductive bar, there is achieved a sound which is clearer and less noisey. On the other hand, when utilizing metal components, there is achieved a noisier sound, however, the sounds contains louder components. Furthermore, one of the means, either the supports of the bar could be of a semiconductive material, such as carbon, while the other could be of metallic material. Also, the diaphragm can be of numerous types of materials, such as wood, plastic, metal or other materials.

By utilizing the amplifier of the present invention there is achieved a conversion of energy from one form to another and at the same time providing an amplification of the output. Thus, as shown in FIG. 16, a mechanical input can be provided such as the depression of the knob in FIG. 1. Alternately, the input can consist of acoustic power, namely a varying sound wave. The input is converted into an amplified electric output such as an output current. The output current can then be detected or converted into another means for proper use.

Referring now to FIG. 17, there is shown one sound system utilizing the electromechanical amplifying sound transducer of the present invention. The amplifying transducer shown generally as 250 is serially interconnected with a detector, shown as a speaker 260, and a source of electrical energy, shown as battery 270. A switch 280 is also included. When the switch 280 is closed, the device is activated and the amplifying transducer will respond to mechanical or sound input and convert these inputs into an amplified electrical signal which can be detected by the speaker 260. Thus, the amplifying transducer of the present invention can be used for audible sounds, mechanical pulses, binary information, or as a noise or vibration detector in various industrial uses.

Although heretofore the amplifying transducer has been described as including a vibrating diaphragm on which is mounted the conductive supports, it is possible to provide the transducer without the diaphragm. Thus, the conductive supports themselves could receive the acoustic waves and transmit the waves to the weighted conductive bar loosely coupled and interconnecting the supports. The conductive supports could be mounted on a fixed base which only provides support but does not vibrate in response to the acoustic waves. Alternately, the conductive bar itself could receive the acoustic waves and itself vibrate in response thereto.

There has been disclosed heretofore the best embodiments of the invention presently contemplated. However, it is to be understood that various changes and modifications may be made thereto without departing from the spirit of the invention.

What is claimed is:

1. An electromechanical amplifying sound transducer comprising:

a. diaphragm means for receiving acoustic waves and vibrating in response thereto;
b. conductive support means mounted onto said diaphragm and adapted to be connected to a source of electrical energy;
c. weighted conductive bar means loosely coupled to said support means, said support means comprising at least two spaced apart bearing supports said bearing supports each including holes therein such that the holes of the two supports are in axially aligned relationship, each of said supports being connected to opposite terminals of the source of electrical energy, said bar means including a shaft loosely mounted in said axially aligned holes and conductively interconnecting said bearing supports to complete the electrical circuit therethrough, said support means transmitting said vibrations to said bar means whereby said bar means can control the electrical energy delivered from the source of energy so that the acoustic waves are converted into amplified electrical waves, and
d. weight means affixed to said bar means and adjustable along the length of said bar means.

2. The transducer as in claim 1 and wherein said transducer is fixed in a vertical position and wherein the gain of the amplifier is adjustable by varying the angular relationship of said bar means with respect to a vertical axis.

3. The transducer as in claim 1 and wherein at least one of said bar means and said support means is constructed from an electrically semiconductive material.

4. The transducer as in claim 3 and wherein said semiconductive material is carbon.

5. The transducer as in claim 1 and further comprising in electric series combination, battery means providing said source of electrical energy, switch means, and output terminal means, said series combination also including in series therewith said support means and said bar means.

6. The transducer as in claim 5 and further comprising in series therewith detector means coupled to said terminal means.

7. The transducer as in claim 5 and further comprising housing means containing said series combination.

8. The transducer as in claim 7 and wherein said housing means includes a case portion and a flexible cover portion mounted onto said case portion, said case portion containing said battery means, said switch means, and said output terminal means, and said cover portion enclosing and supporting said conductive support means and said bar means and whereby said cover portion also serves as said diaphragm means.

9. An electromechanical amplifying device for transmission of binary information and audible sound, comprising:

a. base means vibrating in response to acoustic waves;

b. at least a pair of spaced apart conductive support means mounted onto said base means and adapted to be connected to a source of electrical energy;

c. weighted conductive bar means loosely contacting said support means and interconnecting them, said support means transmitting said vibrations to said bar means; and d. manually operated mechanical interrupt means unconnected to the electrical circuit, arranged on said base means for mechanically contacting with said bar means for intermittently disconnecting said bar means from said support means when said interrupt means are mechanically actuated, whereby said bar means can control the electrical energy delivered from the source of electrical energy so that the audible sounds and the intermittent disconnections are converted into amplified electrical waves, such that the identical electrical circuit can be utilized for both the transmission of binary information and audible sound.

10. The transducer as in claim 9 and wherein said support means are electrically insulated from said diaphragm means.

11. The transducer as in claim 9 and further comprising insulating means partially interposed in the coupling between said bar means and said support means.

12. The transducer as in claim 11 and wherein said insulating means is an epoxy paint film.

13. The device as in claim 9 and wherein said interrupt means further includes lever means positioned under said bar means to lift it out of contact with said support means, spring loaded contact means engaging said lever to raise it upon depression of said contact means, and biasing means positioned adjacent said lever means for adjusting the resting position of said lever means to be slightly spaced under said bar means.

14. The device as in claim 13 and further comprising a cradle support means positioned on said base means and including a central post therein, and wherein said lever means includes a lower tongue section positioned beneath said bar means, and an upper tongue section fixed to said central post, whereby said lower tongue section is cantilevered from said cradle support means, said contact means includes a T-section wherein a first portion thereof is pivotally coupled to said cradle support means and fixed to said central post and the other portion includes a located knob on one side thereof, and a spring connected between said base means and the other side thereof, whereby as said knob is depressed against said spring, the T-section causes said upper tongue section to tilt thereby raising the lower tongue section to lift said bar.

15. The device as in claim 13 wherein said biasing means includes shoulder means fixed to said central post and abutting said upper tongue section, and screw means coupled to said base means and abutting said shoulder means whereby as said screw means is threaded, said shoulder means causes said upper tongue section to tilt thereby adjusting the position of said lower tongue section.

16. The device as in claim 13 and wherein said pair of conductive support means each include holes therein, such that the holes of the two supports are axially aligned, and wherein said bar means includes a conductive shaft loosely mounted in said axially aligned holes, and wherein the bottom part of at least one of said holes is electrically insulated from said shaft.

17. The device as in claim 16 and wherein said insulating comprises an epoxy paint film.

18. The device as in claim 16 and wherein said holes pass entirely through at least one of said supports and said shaft extends through said hole, and further comprising bearing means coupled to said base means for applying a bearing pressure against the portion of the shaft extending through said hole to prevent said shaft from laterial movement within said supports.

* * * * *